(No Model.)
J. F. WINCHELL, H. V. DIEHL & W. C. DEARDS.
CORN PLANTER.
No. 585,015. Patented June 22, 1897.
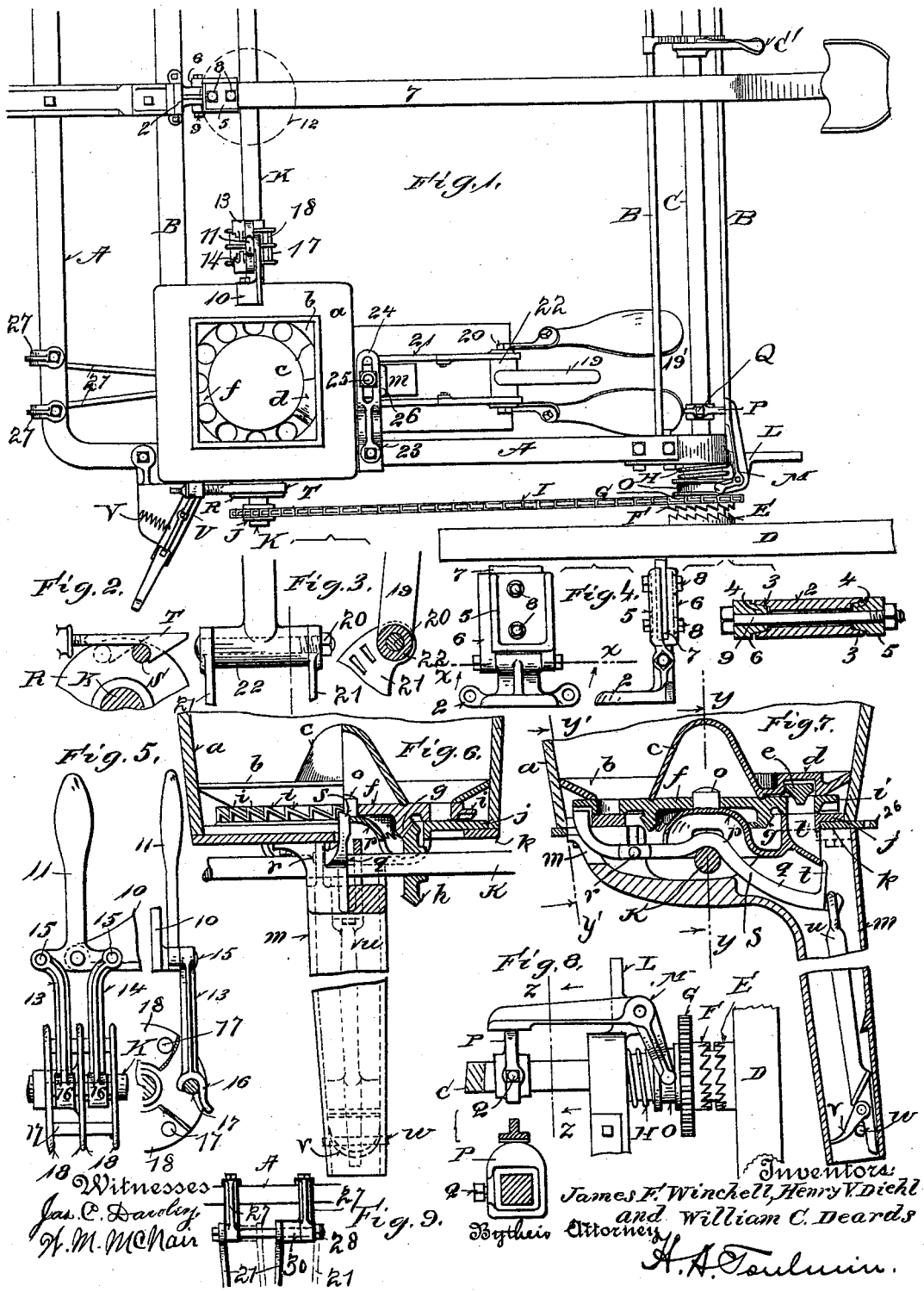
Witnesses:
Jas. C. Davles
H. M. McNair
Inventors:
James F. Winchell, Henry V. Diehl
and William C. Deards
By their Attorney
H. A. Toulmin.

UNITED STATES PATENT OFFICE.

JAMES F. WINCHELL, HENRY V. DIEHL, AND WILLIAM C. DEARDS, OF SPRINGFIELD, OHIO, ASSIGNORS TO THE FOOS MANUFACTURING COMPANY, OF SAME PLACE.

CORN-PLANTER.

SPECIFICATION forming part of Letters Patent No. 585,015, dated June 22, 1897.

Application filed September 12, 1895. Serial No. 562,243. (No model.)

*To all whom it may concern:*

Be it known that we, JAMES F. WINCHELL, HENRY V. DIEHL, and WILLIAM C. DEARDS, citizens of the United States, residing at Springfield, in the county of Clark and State of Ohio, have invented certain new and useful Improvements in Corn-Planters, of which the following is a specification, reference being had therein to the accompanying drawings.

This invention relates to certain new and useful improvements in corn-planters.

Our improvements have reference to a clamp and coupling for connecting the seat-bar with the frame; to the form of the lifting and depressing rod connected with the runner; to a cam and lever for holding a driving sprocket-wheel out of clutch connection with one of the main wheels, so that the dropper mechanism may or may not be operated by the rotation of the main axle; to a new form of hook and ratchet-wheel for operating the seed-dropping devices by the check-row attachment; to a new form of pawl-and-ratchet hand operating device for driving the shaft of the seed-dropping mechanism; to a new cut-off in the discharge-spout and means for operating it, and to a new coupling attachment for connecting the runner with the main frame.

In the accompanying drawings, on which like reference letters and numerals indicate corresponding parts, Figure 1 is a plan view of about one-half of a corn-planter with our improvements applied thereto; Fig. 2, a partial section and side view of the ratchet and hook devices for rotating the dropper-shaft; Fig. 3, an elevation and sectional view of the elevating and depressing rod for the runner; Fig. 4, a plan and side view and a sectional view on the line $xx$ of the seat-bar clamp and coupling; Fig. 5, an elevation and sectional view of the ratchet-and-pawl mechanism for operating the dropper-shaft by hand; Fig. 6, a sectional view of the seed-dropping mechanism, taken partly on the line $y\ y$ and the line $y'\ y'$ of Fig. 7; Fig. 7, a diametrical sectional view of the seed-dropping mechanism; Fig. 8, an enlarged plan view of the cam and lever devices for holding the sprocket out of clutched connection with the main wheel and a detail view of the cam and lever on the line $zz$, and Fig. 9 a view of the runner connection.

The letter A designates the main frame of a corn-planter, and B the cross-bars thereof. An axle C is mounted in the frame and carries ground-wheels D, of which only one is shown. This wheel rotates freely on the axle and has a clutch E and a sprocket-wheel G, adapted to be engaged by a clutch F, mounted to rotate on the axle and forced by a spring H into engagement with the wheel through said clutches. A sprocket-chain I on this sprocket-wheel passes over a smaller sprocket-wheel J on the dropper-shaft K, so as to rotate the latter from the driving or supporting wheel D if desired to use the planter as a drill. On a bracket L a lever M is pivoted with one end engaging a groove in a collar O of the sprocket-wheel G. A cam P, fitted on the main axle C and held by a set-screw Q, engages with the lever M, when the shaft C is slightly turned by the lever C' and forces it out at one end and draws the clutch F away from the clutch E. This is done when it is desired to momentarily not operate the dropper-shaft through the driving-wheel.

The dropper-shaft K has an operating-wheel R thereon, that carries pins S, engaged by a hook T, connected with the pivoted lever U of the check-row attachment, and adapted, when acted on by the usual check-row wire, to draw on the hook T and rotate the wheel R and shaft K. The hook T extends partly under the pin S, so that when the next pin strikes the hook, when in the position shown in dotted lines in Fig. 2, it cannot lift the hook. Thus the hook acts as a stop to check the momentum of the wheel R, and consequently check the dropping-shaft, with its dropping mechanism, to prevent rotating too far. A spring V returns the lever U and hook T to the position shown in Fig. 1 after being operated by a knot in the wire. A seedbox $a$ is mounted on the frame in any desired manner and contains the usual top plate $b$, with its crown $c$ and raised portion $d$, under which is fitted the usual ejector $e$ to arrest the grain and cause it to drop through the dropper-plate. Beneath the top plate $b$ is the dropper-plate $f$, perforated, as usual, and having on its lower side a bevel-pinion $g$, engaged by a similar pinion $h$ on the dropper-shaft K to rotate the dropper-plate. Around the outer edge of the dropper-plate are provided ratchet-teeth or a succession of inclines $i$, which act, in a manner presently to appear, to vibrate the lever by which the valve-spout is opened and closed. Beneath the dropper-plate is the bottom plate $j$, resting on the bottom $k$. This bottom plate has an opening $l$, through which the corn drops into the spout $m$, that extends from the hopper $a$ down into the runner. The bottom plate also has a central stud $o$, on which the dropper-plate $f$ turns. The bottom plate $j$ is formed into a crown $p$ to give room for the play of the valve-lever $q$ between such plate and the dropper-shaft K. This lever $q$ is pivoted at $r$ in the sides of the upper part of the spout $m$. The upper end of the lever $q$ is inclined, as shown at $s$ in Fig. 6, and is adapted to be struck and depressed by the inclines or teeth $i$ of the dropper-plate as it rotates. Thus the lever $q$ is vibrated in one direction while it gravitates in the other. This lever has a wing $t$, which forms a cut-off for the passage $l$. It also has hung upon it a valve-rod $u$, fitted to move up and down in the spout $m$ and carrying a pivoted valve proper, $v$. A cross-pin $w$ throws the valve $v$ against the side of the spout and holds the valve-stem against the other side, and thus closes the spout. When the stem is raised by the lever $q$, the valve $v$ rides on the pin $w$ and opens the spout.

The inclines or teeth $i$ are so located on the dropper-plate that they actuate the lever $q$ at the proper time and required frequency to deposit the corn the desired distance apart. When the cut-off $t$ closes the passage $l$, the spout is opened, and when the spout is closed the passage $l$ is opened.

Referring now to the coupling and clamp for the seat-bar, Fig. 4, a casting 2 is bolted to the cross-piece B and has a bolt-hole through it and tapering recesses 3 at its edges. In these recesses are fitted the tapering trunnions 4 of the respective clamping-plates 5 and 6. These plates receive between them the seat-bar 7 and are held by the bolts 8. The bolt 9 connects the plates with the casting 2 pivotally. Thus the seat may be raised or lowered, if desired, and the trunnions prevent rocking motions of the seat proper.

Referring to the hand mechanism for rotating the dropper-shaft, Figs. 1 and 5, we mount a bracket 10 on the feed-box and pivot to it a hand-lever 11, adapted to be rocked crosswise the machine by a boy or a man sitting on a seat, (indicated by the dotted circle 12.) At opposite sides of its pivot this lever carries pawls 13 and 14, hung on pivots 15. The lower ends of these pawls are bifurcated or formed into jaws 16, adapted to fit over pins 17, which in effect form teeth of a wheel composed of disks 18, interconnected by said pins. When the lever 11 is vibrated, say, toward the grain-box, the pawl 13 will press down on the pin and rotate the wheel, which, being rigidly mounted on the dropper-shaft K, will rotate the shaft. During the same movement the pawl 14 moves up and a succeeding pin moves down, with the result that the pin passes within the jaws of the pawl 14. A reverse movement of the lever depresses the pawl 14 and again turns the wheel a short distance, while the pawl 13 rises and the next pin passes into its jaws. Thus a regular intermittent rotation of the dropper-shaft is effected by a hand manipulation of the lever 11. Finally, the lifting and pressing rod 19, which is connected by a bolt 20 with the rear end of the runner 21, is provided with a cross-sleeve 22 of a length equal to the width or distance between the sides of the runner. The bolt 20 passes through this sleeve, which by reason of its length forms an elongated bearing that prevents the twisting or sidewise swinging of the rod 19 in its relations to the sides of the runner.

A bracket 23 is bolted to one of the side beams A of the frame and slotted at 24 to receive the bolt 25, which passes through the lug 26 of the bottom plate $k$ of the grain-box and thus additionally holds said box to the frame.

Brackets 27 are secured to the main frame and carry a bolt 28, having a transferable collar 30. The runner 21 is hung on this bolt, and by setting one or the other branch of the runner inside of the brackets, with the collar between the inside branch and the nearest bracket, the distance from one runner to the other may be changed to suit the distance desired between the rows. An intermediate change may also be made by placing both branches of the same runner between the brackets and the collar outside of either bracket. Thus three adjustments of the width of rows are provided by this simple arrangement.

Having thus fully described our invention, what we claim as new, and desire to secure by Letters Patent, is—

1. In a corn-planter, the combination of the main axle adapted to be rocked, and means to rock it, the driving-wheel with a clutch-face, a sprocket-wheel with a clutch-face, a spring to clutch their faces on the main axle, a lever engaging with a collar of the sprocket-wheel, and a cam on the shaft to engage and disengage with the lever and to operate it by rocking said main axle, dropping mechanism and a shaft therefor with a sprocket-pinion, a chain connecting said pinion and said sprocket-wheel together.

2. In a corn-planter, the combination with the seed-dropping mechanism including a spout, of a lever adapted to be vibrated by the dropping-plate, a valve in the spout with a valve-stem connected to said lever, the valve being adapted to close the spout when the lever is inactive and open the spout when the lever is vibrated.

3. In a corn-planter, the combination with the dropping mechanism including a spout, and inclines on the dropping-plate, of a lever actuated by said inclines, a valve-stem connected to the lever and a valve to said stem which closes the spout when the lever is inactive and opens the spout when the lever is vibrated.

4. In a corn-planter, the combination with dropping mechanism including a spout, a revolving dropping-plate and a lower plate with a passage, of a lever adapted to be vibrated by the dropping-plate, a cut-off on the lever to close said passage, a valve and stem within the spout and connected to the lever, the vibrations of the lever closing the passage and opening the spout, and vice versa.

5. In a corn-planter, the combination with the dropping mechanism including a spout, a dropping-plate with inclines and a lower plate with a passage, of a lever vibrated by said inclines, a cut-off on the lever to close said passage, a valve-stem hung on the lever with a valve located in the spout, the vibrations of the lever closing the passage and opening the spout and vice versa.

6. In a corn-planter, the combination with the dropping mechanism including a spout, a dropping-plate with inclines, and a lower plate with a passage, of a lever pivoted beneath the lower plate with one end arranged to be actuated by said incline, and a cut-off near the other end, a valve and stem in the spout, the stem being hung on the lever and the valve supported by a cross-pin.

7. In a corn-planter, the combination with the grain-spout with the cross-pin or projection, of a valve-stem within the spout, and a valve proper pivoted to the stem, said pin or projection being between the stem and the valve proper for the purpose described.

8. In a corn-planter, the combination with the dropper-shaft and a wheel thereon with cross-pins forming a ratchet-wheel, of a lever pivoted near the said wheel and two pawls pivoted to said lever, one on each side of the center of the lever, both of said pawls being on the same side of the center of said wheel, so that when said lever is vibrated in one direction one pawl presses down on one pin and partially rotates the wheel so that when said lever is vibrated in the other direction the other pawl presses down on the next pin, said pawls always acting on the same side of the center of said wheel.

9. In a corn-planter, the combination of a casting having tapering recesses, of two plates each with a tapering projection adapted to fit the respective recesses, a bolt pivotally connecting said plates and casting, and a seat-bar clamped between said plates.

10. In a corn-planter, the combination with the main frame, and brackets secured thereto, and carrying a bolt, of a runner divided into branches hung on said bolt, and adapted to be placed with either branch inside of the brackets, and a collar on the bolt and adapted to be placed between the inside branch and the nearest bracket for the purpose described.

In testimony whereof we affix our signatures in presence of two witnesses.

JAMES F. WINCHELL.
HENRY V. DIEHL.
WM. C. DEARDS.

Witnesses:
H. S. BRADLEY,
HORATIO J. FORGY.